Patented Dec. 17, 1929

1,740,226

UNITED STATES PATENT OFFICE

EMIL CZAPEK AND RICHARD WEINGAND, OF BOMLITZ, NEAR WALSRODE, GERMANY

MANUFACTURE OF SHEETLIKE ARTICLES AND THE LIKE FROM CELLULOSE

No Drawing. Application filed August 31, 1926, Serial No. 132,894, and in Germany September 1, 1925.

This invention has reference to a process of manufacturing non-filamentary products as sheets of cellulose, such as films, pellicles, bands, ribbons and the like from cellulose-solutions, and it is intended to overcome the various difficulties heretofore experienced in the manufacture of such products. The copending application 132,900 relates to the manufacture of artificial silk i. e. of filamentary cellulose products which are not included in the present application. For the manufacture of non-filamentary articles as of films, pellicles, bands, hollow bodies, capsules and the like from cellulose only inorganic aqueous or acid salt solutions have been employed as precipitants for the cellulose solutions, such as viscose, copperoxid-ammonia-cellulose and the like. As the most suitable bath for the purpose in question a bath consisting of a staurated solution of ammonia salt and containing 2% of free acid has been found. Now, it is of very great industrial and commercial importance in the manufacture of these and similar articles possessing greater sectional areas than threads of artificial silk to employ a quickly acting precipitating bath. The assumption that the precipitating baths employed for the manufacture of artificial silk and containing a high percentage of acid may also be adapted for the manufacture of films, bands, pellicles, capsules and similar articles has not been borne out by the facts, because, instead of producing a more rapid precipitation the high percentage of acid commonly employed in these baths results in such far reaching decomposition of the cellulose solution that gas bubbles are formed in the interior of the articles obtained, so as to make them unfit for use. Even a precipitating bath which consists of a solution of pure sodium-bisulphate without an excess of acid, cannot be employed therefore for the manufacture of such and similar articles.

It has however been ascertained in the course of our experiments that precipitating baths comprising non-aqueous mixtures or solutions are particularly suitable for the manufacture of films, bands, capsules, pellicles and of similar articles from cellulose. Thus we may employ for this purpose for instance a mixture or a solution of a low boiling alcohol with an inorganic acid or with an inorganic salt or mixtures of both these ingredients. As a particularly suitable solvent or dispersing agent we employ for instance methanol for the purposes in question.

In accordance with the results of our practical experience the following mentioned precipitating baths may for instance be used:

(1) A mixture of methanol with 40% free sulphuric acid;

(2) A solution of 10% chloride of magnesium in methanol;

(3) A solution of 10% magnesium-chloride and 10% hydrochloric acid in methanol.

The baths in accordance with this invention are particularly distinguished by an extremely rapid precipitating action. It is also possible in this connection to work with a high concentration of acid that is to say as an instance with a precipitating bath containing up to 45% sulphuric acid, without any danger of producing injurious destructive action. This high concentration of acid increases moreover the precipitating velocity. There is the further advantage that with the new precipitating baths in view of their strongly dehydrating action extremely strong articles both in the wet and dry condition may be obtained which, moreover, after being dried possess a considerably higher degree of water-proof qualities than the products obtained by the aid of the usual aqueous baths. The articles thereby produced are moreover distinguished by the fact that they can be washed off without injury. The precipitating baths according to this invention show the further advantage that they remain perfectly clear instead of becoming very turbid as a result of the by-products produced in the precipitation. Furthermore than that, the salts formed in the precipitation in view of their insolubility in methanol are separated off, and may be easily removed from the bath. Thus for instance in the case of a bath consisting of a solution of magnesium-chloride and free hydrochloric acid in methanol sodium-chloride is formed which is precipitated and collects at the bottom of the container.

Instead of methanol or of other low boiling alcohols all other organic liquids may be employed which are adapted to be mixed with inorganic acids or to dissolve inorganic salts. We may also employ mixtures of two or more of such liquids. The process may also be carried out by first coagulating the cellulose solution in pure methanol or in any other organic liquid, such as for instance ethyl-alcohol, and by then submitting the product to a subsequent after-treatment with the new precipitating baths according to this invention.

Other modifications and changes may also be introduced so as to better adapt the invention to varying conditions of application within the scope and spirit of the invention as defined by the appended claims.

We claim:—

1. In the manufacture of sheet-like and other non-filamentary articles from viscose and similar aqueous cellulose solutions, the introduction of the cellulose solution in the suitable form into a precipitating bath which is constituted by a non-aqueous solution consisting on the one hand of a non-aqueous solvent and on the other hand of an inorganic coagulant for cellulose solutions.

2. In the manufacture of sheets, bands, foils and other non-filamentary cellulose objects from viscose and similar aqueous cellulose solutions, the introduction of the cellulose solution in suitable form into a precipitating bath constituted by a non-aqueous solution containing on the one hand a non-aqueous solvent and on the other hand an inorganic acid.

3. In the manufacture of non-filamentary articles from viscose and other aqueous cellulose solutions, the introduction of the cellulose solution in suitable form into a precipitating bath constituted by a non-aqueous solution of an inorganic salt in a non-aqueous solvent.

4. In the manufacture of non-filamentary articles from aqueous cellulose solutions, the introduction of the cellulose solution in suitable form into a precipitating bath which is constituted by a non-aqueous solution consisting on the one hand of a non-aqueous solvent and on the other hand of a mixture of an inorganic acid and an inorganic salt.

5. In the manufacture of non-filamentary articles from viscose and other aqueous cellulose solutions, the introduction of the cellulose solution in suitable form into a precipitating bath constituted by a non-aqueous solution of an inorganic coagulant in a low boiling alcohol.

6. In the manufacture of non-filamentary objects from aqueous cellulose solutions the introduction of the cellulose solution in suitable form into a precipitating bath constituted by a non-aqueous solution of an inorganic coagulant in methanol.

7. In the manufacture of non-filamentary objects from aqueous cellulose solutions by introducing the cellulose solution in suitable form into a precipitating bath, the employment as precipitating bath, of a non-aqueous solution of an inorganic salt in methanol.

8. In the production of non-filamentary articles from aqueous cellulose solutions by introducing the cellulose solution in suitable form into a precipitating bath, the employment as precipitating bath, of a non-aqueous solution of an inorganic acid in methanol.

9. In the production of non-filamentary articles from aqueous cellulose solutions by introducing the cellulose solution in suitable form into a precipitating bath, the employment as precipitating bath, of a non-aqueous acidulated solution of an inorganic salt in methanol.

10. In the manufacture of non-filamentary objects from aqueous cellulose solutions, the introduction of the cellulose solution in suitable form first into substantially pure methanol and then into a non-aqueous solution of an inorganic precipitant in methanol.

11. In the production of non-filamentary objects from aqueous cellulose solutions by introducing the cellulose solution in suitable form into substantially pure methanol and then treating the resulting product with a non-aqueous liquid precipitating agent.

12. As a new article of manufacture a non-filamentary body consisting of cellulose solidified by an inorganic coagulant with methanol and having very high tearing strength and waterproof qualities.

In testimony whereof we affix our signatures.

Dr. EMIL CZAPEK.
Dipl. Ing. RICHARD WEINGAND.